United States Patent
Iiyama

(10) Patent No.: US 11,115,557 B2
(45) Date of Patent: Sep. 7, 2021

(54) READING DEVICE

(71) Applicant: Panasonic Intellectual Property Management Co., Ltd., Osaka (JP)

(72) Inventor: Tomoko Iiyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/574,753

(22) Filed: Sep. 18, 2019

(65) Prior Publication Data
US 2020/0014814 A1 Jan. 9, 2020

Related U.S. Application Data

(63) Continuation of application No. PCT/JP2017/036068, filed on Oct. 4, 2017.

(30) Foreign Application Priority Data

Mar. 27, 2017 (JP) .............................. JP2017-061040

(51) Int. Cl.
H04N 1/107 (2006.01)
H04N 1/028 (2006.01)
H04N 1/00 (2006.01)

(52) U.S. Cl.
CPC ....... H04N 1/1072 (2013.01); H04N 1/00551 (2013.01); H04N 1/02865 (2013.01)

(58) Field of Classification Search
CPC ............. H04N 1/1072; H04N 1/00551; H04N 1/02865
USPC ................................ 358/482, 1.15, 1.9, 483
See application file for complete search history.

(56) References Cited

U.S. PATENT DOCUMENTS

| | | | |
|---|---|---|---|
| 2002/0181030 A1* | 12/2002 | Khovaylo | H04N 1/00551 358/494 |
| 2009/0316222 A1* | 12/2009 | Oshida | H04N 1/19 358/474 |
| 2009/0323139 A1* | 12/2009 | Itoh | H04N 1/02815 358/474 |

(Continued)

FOREIGN PATENT DOCUMENTS

| | | |
|---|---|---|
| CN | 101794933 | 8/2010 |
| JP | 2000-358131 | 12/2000 |

(Continued)

OTHER PUBLICATIONS

International Search Report dated Dec. 19, 2017 in International (PCT) Application No. PCT/JP2017/036068.

(Continued)

Primary Examiner — Quang N Vo
(74) Attorney, Agent, or Firm — Wenderoth, Lind & Ponack, L.L.P.

(57) ABSTRACT

A reading device includes a housing, an imaging unit, a reading lighting unit, a guiding unit, and a guiding lighting unit. The housing has an opening covered with a transparent opening cover. An imaging unit is disposed inside the housing. The reading lighting unit illuminates the opening cover from inside the housing. The guiding unit is provided on the same plane as the opening cover at a position separated from the opening cover. The guiding lighting unit emits light from the guiding unit to the outside of the housing.

11 Claims, 6 Drawing Sheets

(56) References Cited

U.S. PATENT DOCUMENTS

| | | |
|---|---|---|
| 2010/0194660 A1 | 8/2010 | Yoneda et al. |
| 2015/0319329 A1* | 11/2015 | Matsuzawa ............ H04N 1/028 358/475 |
| 2019/0147307 A1* | 5/2019 | Takayama ............ G06K 15/183 358/1.15 |

FOREIGN PATENT DOCUMENTS

| | | |
|---|---|---|
| JP | 2006-146328 | 6/2006 |
| JP | 2007-49428 | 2/2007 |
| JP | 4449855 | 4/2010 |
| JP | 2010-134736 | 6/2010 |
| JP | 2010-206770 | 9/2010 |
| JP | 2010-251930 | 11/2010 |
| JP | 2011-254268 | 12/2011 |
| JP | 2011-259003 | 12/2011 |
| JP | 2013-45129 | 3/2013 |
| JP | 2013-84128 | 5/2013 |
| JP | 2013-84129 | 5/2013 |
| WO | 2010/038329 | 4/2010 |

OTHER PUBLICATIONS

English Translation of Office Action dated Nov. 19, 2020 in Chinese Patent Application No. 201780088970.3.

* cited by examiner

READING DEVICE

TECHNICAL FIELD

The present disclosure relates to a reading device that captures an image of a surface to be read by irradiating the surface with illumination light.

BACKGROUND ART

Patent Literature 1 discloses a reading device that obtains an image of a paper surface of an object to be read. The reading device includes a mounting surface, a light source for illuminating the mounting surface, and a camera for capturing the image of the paper surface of the object to be read. This makes it possible to obtain an excellent image even if a deformation occurs on the paper surface of the object to be read. The light source is disposed outside a front region of a page to be read. The page to be read includes a near edge code located close to an edge of the page. The light source includes an infrared light emitting diode (LED) row and a white LED row. One of the infrared LED and the white LED at a near-edge code position corresponding to the near-edge code is disposed closer to the page to be read in a vertical direction on the mounting surface, than the other one of the infrared LED and the white LED is. This makes it possible to obtain an excellent image even if a deformation occurs on the paper surface of the object to be read.

CITATION LIST

Patent Literature

PTL 1: Unexamined Japanese Patent Publication No. 2010-251930

SUMMARY

The present disclosure provides a reading device that captures an image of a surface to be read by irradiating the surface with illumination light.

The reading device of the present disclosure includes a housing, an imaging unit, a reading lighting unit, a guiding unit, and a guiding lighting unit. The housing has an opening covered with a transparent opening cover. The imaging unit is disposed inside the housing. The reading lighting units illuminates the opening cover from inside the housing. The guiding unit is provided at a position separated from the opening cover on the same plane as the opening cover. The guiding lighting unit emits light from the guiding unit to the outside of the housing.

The reading device of the present disclosure is effective for capturing an image of a surface to be read by irradiating the surface with illumination light.

DESCRIPTION OF EMBODIMENT

An exemplary embodiment will be described in detail below with reference to the drawings as appropriate. However, detailed description more than necessary may be omitted. For example, the detailed description of well-known matters and redundant description of structures that are substantially the same may be omitted. This is to avoid unnecessary redundancy in the following description and to facilitate understanding by those skilled in the art.

It is to be noted that the accompanying drawings and the description below are provided to enable those skilled in the art to fully understand the present disclosure, and are not intended to limit the claimed subject matter.

In recent years, more and more travelers have been using self-service passport control at an airport with a passport reading device, instead of being checked by an immigration officer. In this case, it is necessary to consider a traveler who uses the device for the first time, and it is required that an operation method be easy to understand. In light of these circumstances, the present disclosure provides a user-friendly reading device.

First Exemplary Embodiment

Hereinafter, reading device 100 according to a first exemplary embodiment will be described with reference to FIGS. 1 to 6.

[1-1. Configuration]

Figure 1:
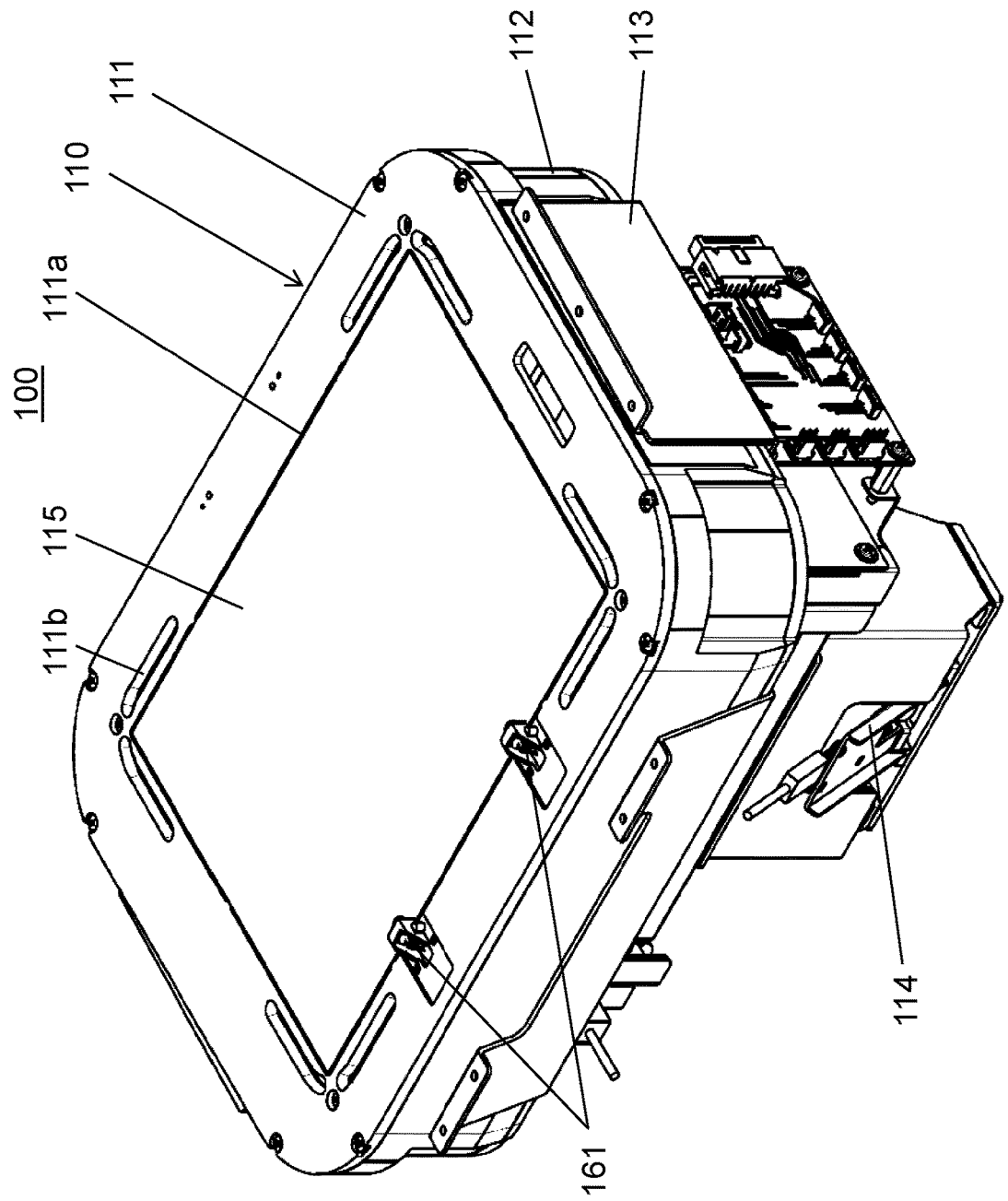
FIG. 1 is a perspective view illustrating an external appearance of a reading device according to a first exemplary embodiment.
Figure 2:
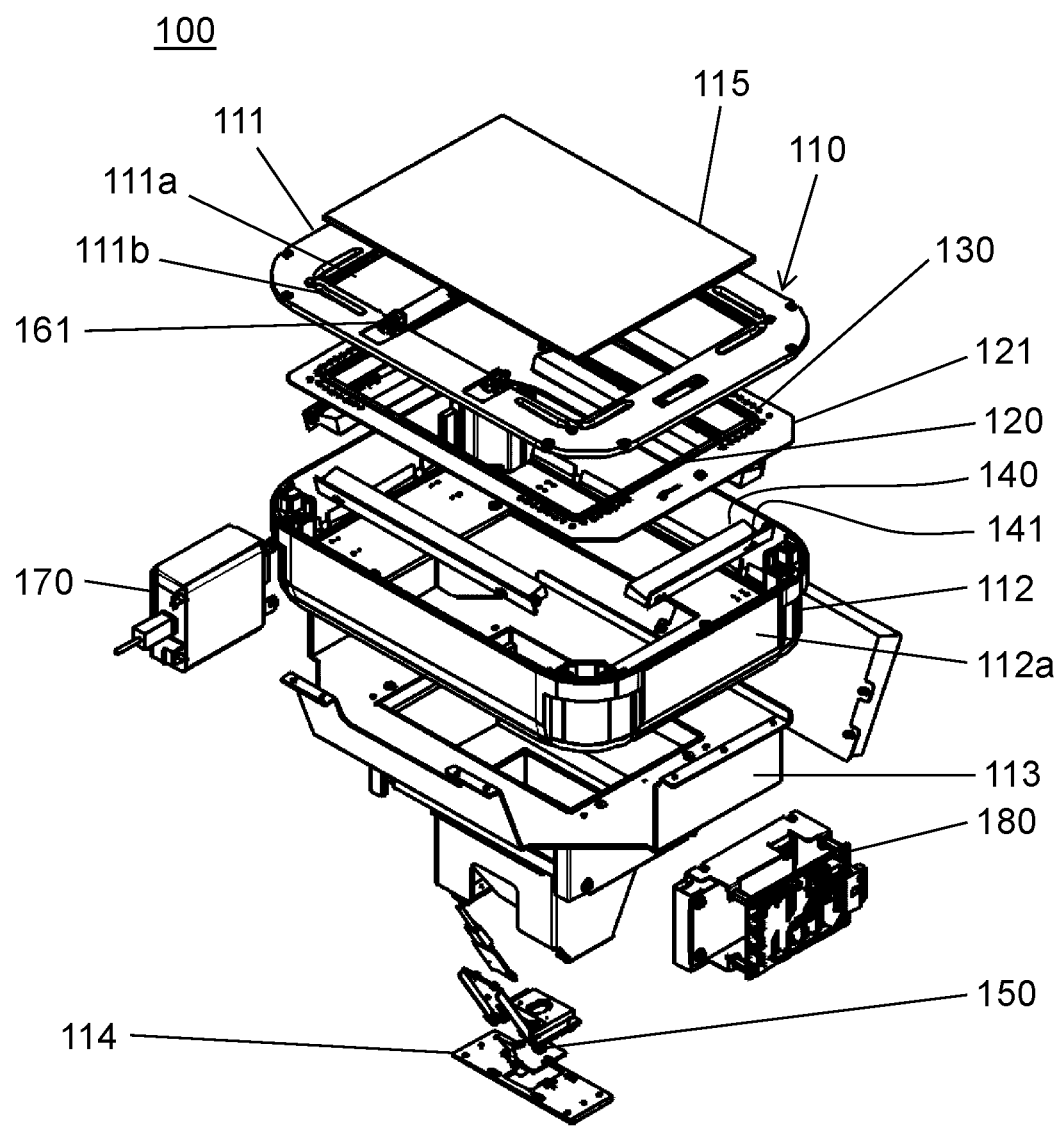
FIG. 2 is an exploded perspective view of the reading device according to the first exemplary embodiment.

FIG. 1 is an overall perspective view of reading device 100 according to the first exemplary embodiment. FIG. 2 is an exploded perspective view of reading device 100 according to the first exemplary embodiment.

Reading device 100 is a device to capture an image of a form having a surface to be read, such as a passport, and recognize a character or an image on the form. Further, when a form including an integrated circuit (IC), such as a passport, is read, reading device 100 is able to communicate with the IC in the passport.

As illustrated in FIGS. 1 and 2, reading device 100 according to the first exemplary embodiment has housing 110 that includes top cover 111 (one example of housing cover), bottom cover 112, support frame 113, camera base 114, and opening cover 115. Top cover 111 has opening 111*a* to support opening cover 115. Bottom cover 112 is a box-shaped member that has an opening on a bottom surface, and supports top cover 111. Support frame 113 supports bottom cover 112. Camera base 114 is fixed to support frame 113 and supports camera 150 that captures an image of a form (one example of imaging unit). Opening cover 115 is supported by top cover 111 while being fitted into opening 111*a*. That is, housing 110 has an opening that is covered by opening cover 115. Opening cover 115 is formed of a transparent member such as glass or plastic.

As illustrated in FIG. 2, reading device 100 internally includes IC antenna 120 (one example of communication antenna), guide light 130 (one example of guiding lighting unit), illumination light 140 (one example of reading lighting unit), and camera 150. IC antenna 120 is an antenna for communicating with an IC in a passport or the like. When reading device 100 reads an IC-included form such as a passport, IC antenna 120 communicates with the form in order to obtain written information on a passport page such as a face image, a nationality, a name, a date of birth, and a passport number that are recorded in the IC in the passport. IC antenna 120 is mounted on antenna board 121 that is disposed directly under top cover 111. Antenna board 121 is an annular board that has an opening. The opening of antenna board 121 is larger than opening 111a of top cover 111. Guide light 130 includes a plurality of light sources 131 (refer to FIG. 3) and guides a user to be able to place the form appropriately on opening cover 115. A light emitting diode is used as light source 131 that forms guide light 130 in this exemplary embodiment. However, light source 131 is not limited to a light emitting diode. A laser diode, an organic light emitting diode, and other light sources may be used as light source 131. When an image of the form is captured, illumination light 140 illuminates a surface of the form to be read. That is, illumination light 140 illuminates opening cover 115 inside housing 110. Illumination light 140 is disposed closer to opening cover 115 than camera 150 is.

Figure 6:
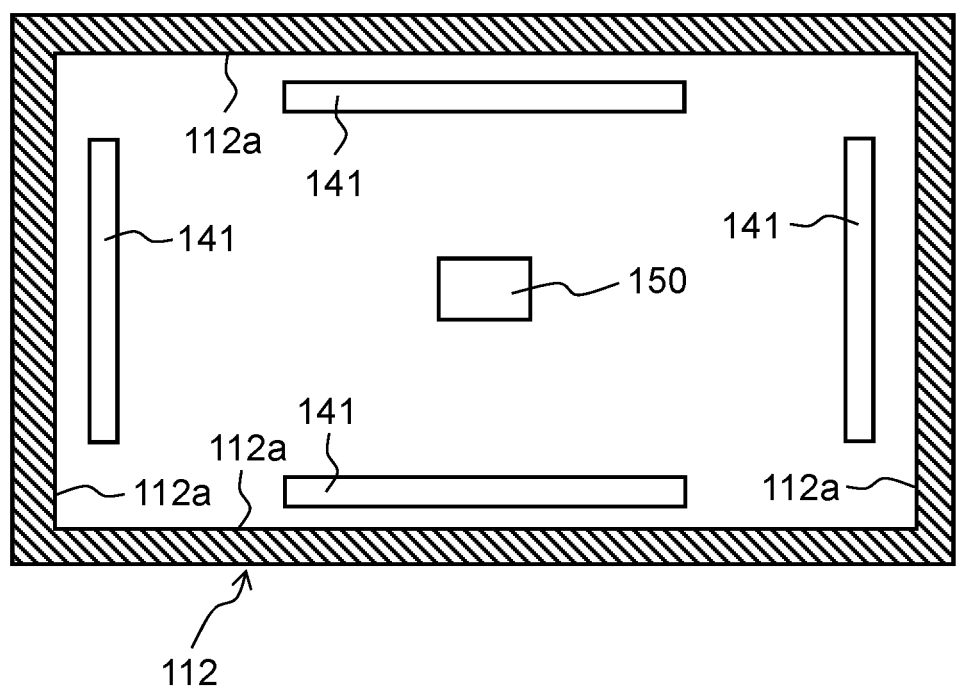
FIG. 6 is a schematic cross-sectional view, seen from above, of the reading device according to the first exemplary embodiment.

As illustrated in FIG. 6, illumination light 140 includes four lighting units 141. Each lighting unit 141 includes a plurality of light sources arranged in an array (linearly). Four lighting units 141 are respectively disposed along four sidewalls 112a of bottom cover 112. Camera 150 includes an imaging element and an imaging optical system having a plurality of lenses, and captures an image of the form to be placed (one example of object) on opening cover 115 that is located within an angle of view of camera 150. Camera 150 is located at a center of four lighting units 141 in a top view. In other words, lighting units 141 are disposed so as to surround camera 150 in the top view.

Figure 3:
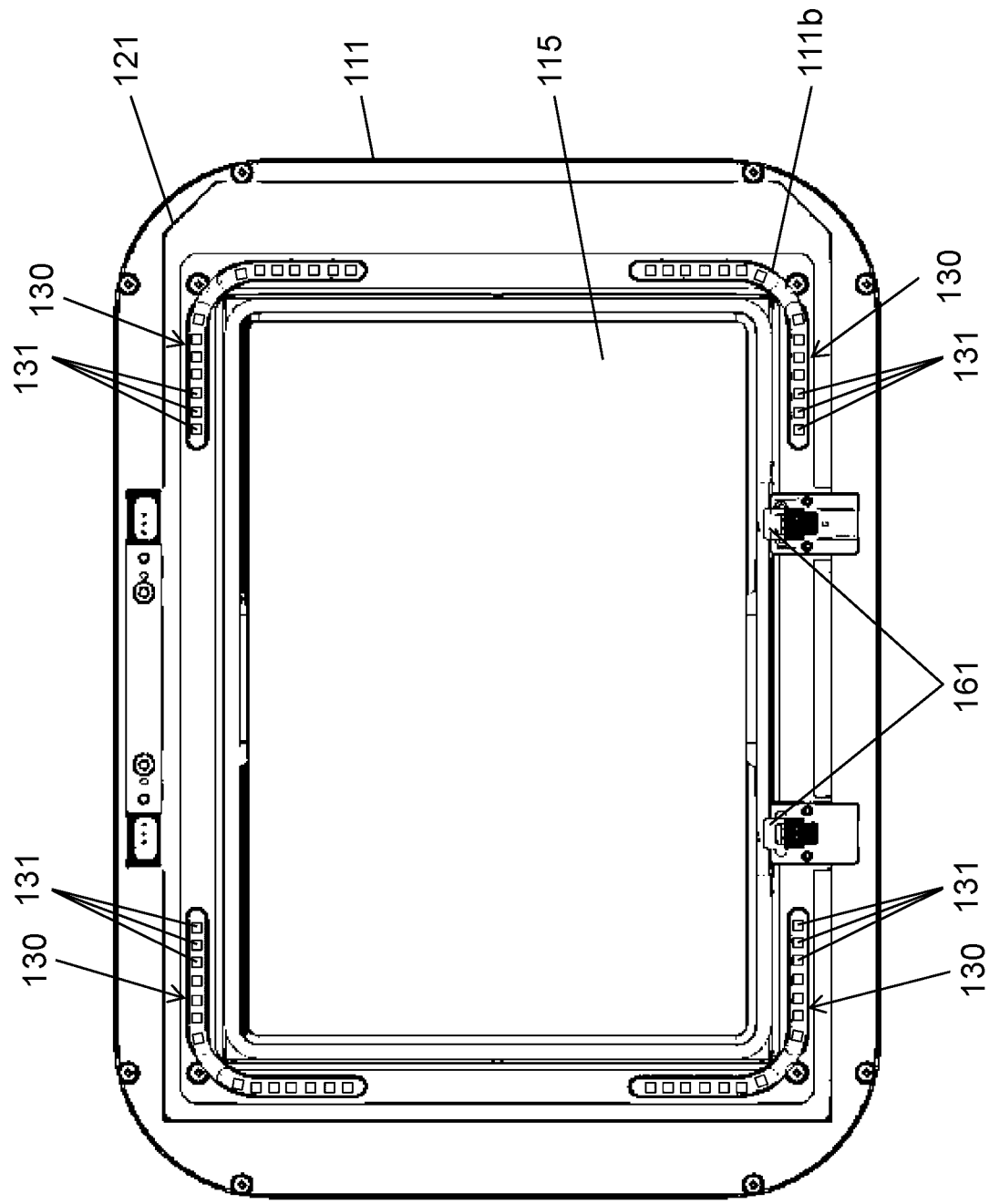
FIG. 3 is a schematic top view of the reading device according to the first exemplary embodiment.

FIG. 3 is a top view of reading device 100 in the first exemplary embodiment and illustrates internal members in perspective for the sake of convenience. As illustrated in FIG. 3, guide light 130 is disposed at each of four positions in diagonal directions of reading device 100. Light source 131 forming guide light 130 is mounted on antenna board 121. Top cover 111 of reading device 100 has guide light unit 111b (one example of guiding unit) as an opening, at each of four corners of top cover 111, to pass light from guide light 130. That is, guide light unit 111b is provided at each of the four diagonal positions of opening 111a of top cover 111. Guide light 130 mounted on antenna board 121 emits light to the outside of housing 110 from guide light unit 111b. Guide light 130 according to the first exemplary embodiment is disposed in a substantially L-shape on the outer side of four corners of opening cover 115. That is, guide light 130 has the L-shape and is disposed at a position corresponding to a corresponding one of corners of the opening of housing 110. This enables a user to recognize substantially L-shaped guide lights 130 at the four positions as a frame that indicates a region on which the form is to be placed. This makes it possible to guide the user to place the form such as a passport within a surface of opening cover 115. Further, guide light 130 changes a color of emitted light or flashes in order to provide a visual recognition of an operation process such as imaging the form or reading information in the IC.

The plurality of light sources 131 of guide light 130 is not disposed around an entire periphery of opening 111a in consideration of an influence on IC antenna 120. Further, the plurality of light sources 131 is arranged in an array in order to visually indicate a reading position without the arrangement of light sources 131 around the entire periphery of opening 111a. Since the plurality of light sources 131 is disposed in the array, brightness can also be secured for a sufficient recognition from a distant place. The arrangement of the plurality of light sources 131 is not limited to the array-like arrangement, but any arrangement may be applied as long as a position at which the form is placed is guided. That is, it is sufficient if guide light 130 can emit light so as to surround opening cover 115 on which the form is placed. More specifically, the plurality of light sources 131 may be disposed only on three sides other than one side of rectangular opening cover 115. Alternatively, the plurality of light sources 131 may be disposed in the substantially L-shape only on the outer side of two opposite diagonals among the diagonals of opening cover 115. Alternatively, the plurality of light sources 131 may be disposed in the substantially L-shape only on the outer side of one diagonal among the diagonals of opening cover 115. Alternatively, the plurality of light sources 131 may be disposed linearly in parallel to the four sides of opening cover 115. Alternatively, the plurality of light sources 131 may be disposed linearly in parallel to only two opposite sides among the four sides of opening cover 115.

A cost reduction can be achieved with the plurality of light sources 131 of guide light 130 and IC antenna 120 mounted on same antenna board 121. It is also possible to achieve a reduced height or a simplified design in a periphery of top cover 111.

Guide light unit 111b is the opening through which the light of light source 131 passes to the outside of housing 110 through top cover 111. Guide light unit 111b has such a size that the light of guide light 130 passing to the outside of housing 110 is not interrupted and heat stay is prevented, as well as that a weighting strength of top cover 111 is maintained. Infrared emitter 161 is disposed on the top of top cover 111. As details will be described below, infrared emitter 161 includes a sensor that identifies whether the form has been placed on opening cover 115.

Figure 4:
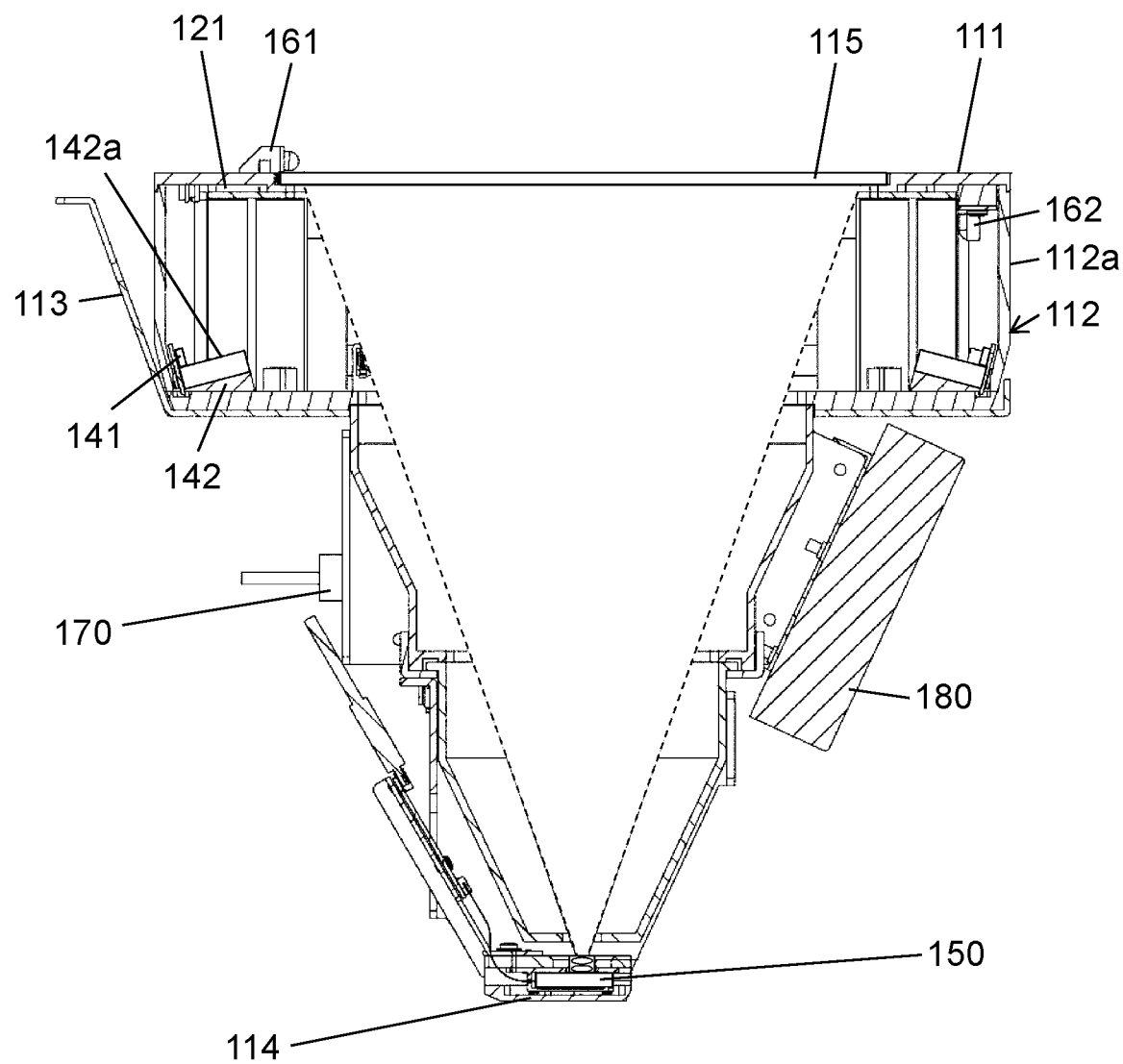
FIG. 4 is a schematic cross-sectional view of the reading device according to the first exemplary embodiment.

FIG. 4 is a cross-sectional view of reading device 100 according to the first exemplary embodiment.

Opening cover 115 is located within an angle of view of camera 150 that is provided on the lowest part of support frame 113. Therefore, when the form is placed on opening cover 115, camera 150 can capture an image of a surface to be read of the form.

Figure 5:
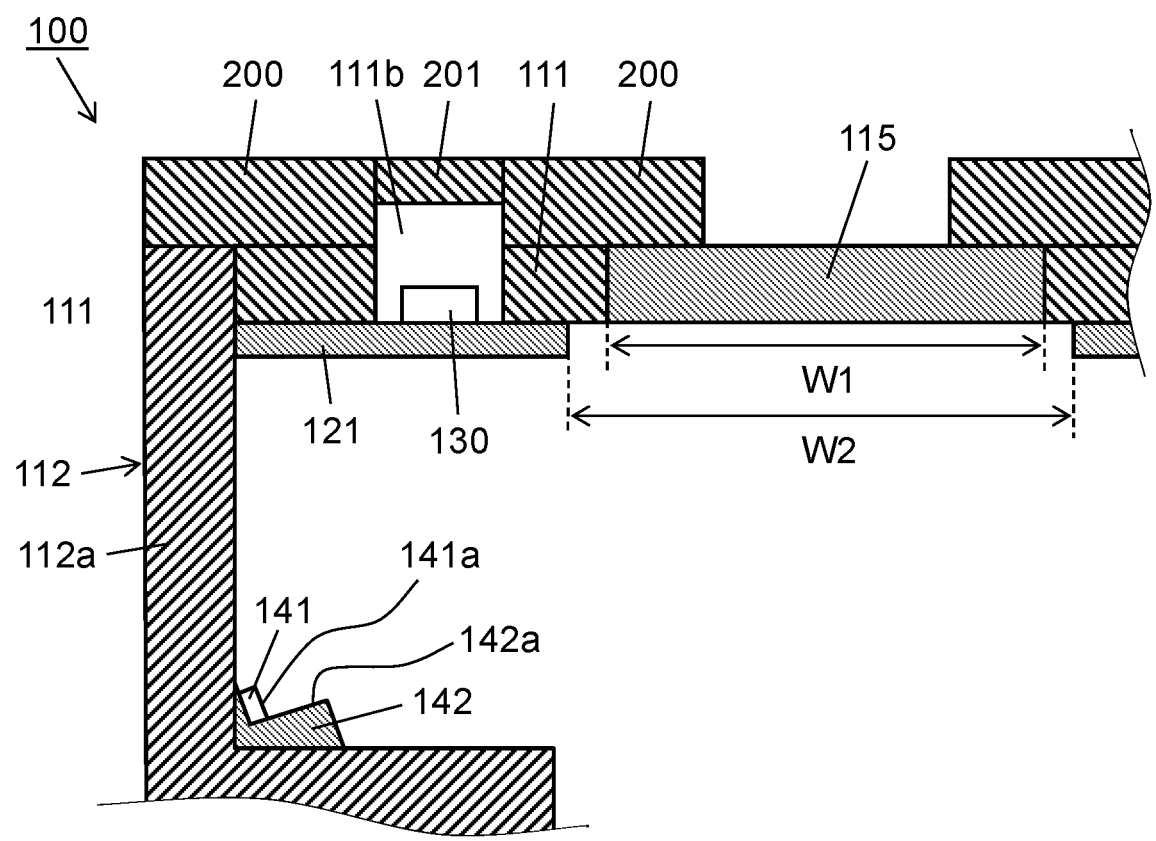
FIG. 5 is a partially enlarged schematic cross-sectional view of the reading device according to the first exemplary embodiment.

FIG. 5 is a partially enlarged schematic cross-sectional view of reading device 100 illustrated in FIG. 4.

In an interior of bottom cover 112, lighting unit 141 is disposed under antenna board 121 with a distance provided to such an extent that there is no influence of a magnetic field on IC antenna 120 (refer to FIG. 2). Lighting unit 141 is disposed along inner sidewall 112a of bottom cover 112. Lighting unit 141 emits light when camera 150 captures an image. Lighting unit 141 is attached to prismatic illumination light supporting unit 142 so that light emitting surface 141a of lighting unit 141 faces opening cover 115. Illumination light supporting unit 142 functions as a light-shielding wall in order to prevent the light of lighting unit 141 from directly reaching camera 150. That is, illumination light supporting unit 142 has light-shielding surface 142a that intersects with light emitting surface 141a of lighting unit 141. Occurrence of stray light can also be suppressed with an antireflection coating or the like applied on light-shielding surface 142a.

As illustrated in FIG. 4, reading device 100 according to the first exemplary embodiment includes, inside bottom cover 112, infrared receiver 162 that receives light of infrared emitter 161. The light of infrared emitter 161 is interrupted once the form is placed on opening cover 115.

With this action as a trigger, reading device 100 starts a variety of operations such as reading.

I/O circuit 170 that outputs information obtained by IC antenna 120, controller 180, and the like are arranged on an outer periphery of support frame 113. Controller 180 controls guide light 130, illumination light 140, camera 150, infrared emitter 161, and infrared receiver 162, for example. Controller 180 includes, for example, a central processing unit (CPU) and a memory.

As illustrated in FIG. 5, guide light 130 mounted on antenna board 121 is located in the opening of guide light unit 111b of top cover 111. In other words, guide light 130 is provided at a position separated from opening cover 115 through top cover 111. That is, since non-transparent top cover 111 is located between guide light 130 and opening cover 115, the light of guide light 130 is not emitted toward opening cover 115. For this reason, when the image of the form is captured, the light of guide light 130 dose not enter the surface to be read of the form. Thus, it is possible to prevent the stray light.

Opening width W2 of antenna board 121 is larger than opening width W1 of top cover 111. That is, a width of a hole formed in antenna board 121 is larger than an opening width of housing 110. For this reason, the light of lighting unit 141 enters opening cover 115 without lighting antenna board 121. Thus, a shadow of antenna board 121 is not generated when the form is read.

Decorative plate 200 is disposed on top cover 111. Decorative plate 200 is formed of a milky-white resin that covers top cover 111. Decorative plate 200 has diffusion unit 201 at a location of guide light unit 111b to diffuse and transmit the light from guide light 130. Diffusion unit 201 has a thinner shape in thickness than other parts of decorative plate 200. As a result, while the light of guide light 130 is transmitted, the light of guide light 130 can also diffuse through the milky-white resin, and an effect of reducing a luminance unevenness can be obtained. Further, in addition to improving design, a dustproof and antifouling effect and an effect of enhancing durability against shock or the like on housing 110 can be obtained by providing decorative plate 200.

[1-2. Advantageous Effects and the Like]

As described above, reading device 100 of the present disclosure is provided with housing 110, camera 150, guide light 130, and illumination light 140. Housing 110 includes opening cover 115, top cover 111, bottom cover 112, and support frame 113. This makes it possible to visually guide a user to an operation of reading device 100.

Further, guide light 130 of reading device 100 of the present disclosure is disposed around the periphery of opening cover 115. For this reason, it is possible to visually guide the user to place a surface to be read appropriately on opening cover 115.

Further, guide light 130 of reading device 100 of the present disclosure is disposed at the position separated from opening cover 115. For this reason, when camera 150 captures an image of the surface to be read, the light of guide light 130 is less likely to enter the surface to be read. Thus, an image with high quality can be captured.

Other Exemplary Embodiments

The first exemplary embodiment has been thus described as an example of the technique disclosed in the present application. However, the techniques of the present disclosure are not limited to the above exemplary embodiment, and can also be applied to embodiments in which change, substitution, addition, omission, and the like are performed.

In addition, new exemplary embodiments can be achieved by combining the elements described in the first exemplary embodiment.

Thus, other exemplary embodiments will be described below as examples.

In the first exemplary embodiment, separate top cover 111, bottom cover 112, and support frame 113 have been described as one example of housing 110 of reading device 100. However, housing 110 of reading device 100 may be configured integrally with top cover 111, bottom cover 112, and support frame 113.

Further, in the first exemplary embodiment, guide light 130 has been described as having the plurality of light sources 131 disposed in the array. However, as long as guide light 130 is formed into a frame shape that indicates a region of opening cover 115 on the outside of opening cover 115, guide light 130 may be formed of a light guide member or a surface emitting light source.

Further, in the first exemplary embodiment, IC antenna 120 and guide light 130 have been mounted on the single antenna board 121, but IC antenna 120 and guide light 130 may alternatively be mounted on different boards.

Further, in the first exemplary embodiment, the resin has been described as an example for a member of decorative plate 200, but the member is not limited to the resin as long as decorative plate 200 has diffusion unit 201. That is, when decorative plate 200 is made of metal, decorative plate 200 has a region for diffusing and transmitting the light of guide light 130. This makes it possible to make the light of guide light 130 uniform.

The above-described exemplary embodiment is provided for exemplifying the technology of the present disclosure. Thus, various modifications, substitutions, additions, omissions, and the like can be made in the scope of claims or the equivalents thereof.

INDUSTRIAL APPLICABILITY

The present disclosure is applicable to a device for reading image information and IC chip information written on a form or the like. Specifically, the present disclosure is applicable to a passport reader or the like that reads passport information.

REFERENCE MARKS IN THE DRAWINGS 100 reading device
110 housing
111 top cover
111a opening
111b guide light unit (one example of guiding unit)
112 bottom cover
113 support frame
114 camera base
115 opening cover
120 IC antenna
121 antenna board
130 guide light (one example of guiding lighting unit)
131 light source
140 illumination light (one example of reading lighting unit)
141 lighting unit
142 illumination light supporting unit
142a light shielding surface
150 camera (one example of imaging unit)
161 infrared emitter
162 infrared receiver 170 I/O circuit
180 controller
200 decorative plate
201 diffusion unit

The invention claimed is:

1. A reading device comprising:
a housing having a housing cover that is not transparent, the housing cover including (i) a first opening covered with an opening cover that is transparent and (ii) a second opening provided on a same plane as the first opening at a position separated from the first opening;
a guiding lighting unit that emits light to an outside of the housing to guide a user to appropriately place an object on the opening cover, the guiding lighting unit being located inside the second opening of the housing cover;
a reading lighting unit that illuminates the opening cover from inside the housing and that illuminates that object placed on the opening cover by the user, the reading lighting unit being located on an inner sidewall of the housing; and
an imaging unit disposed inside the housing that images the object placed by the user on the opening cover,
wherein the reading lighting unit is disposed closer to the opening cover than the imaging unit, and the reading lighting unit is configured to prevent light illuminated from the reading lighting unit from reaching the imaging unit.

2. The reading device according to claim 1,
wherein the second opening is provided at the housing.

3. The reading device according to claim 1,
wherein the second opening is provided along an outer periphery of the opening cover, and
the housing cover is disposed between the opening cover and the second opening.

4. The reading device according to claim 1,
wherein the guiding lighting unit includes a plurality of light sources arranged in an array.

5. The reading device according to claim 1, further comprising:
a communication antenna that communicates with an external device; and
an annular board on which the communication antenna is mounted,
wherein a width of a hole formed in the annular board is larger than a width of the first opening of the housing.

6. The reading device according to claim 5,
wherein the guiding lighting unit is mounted on the annular board.

7. The reading device according to claim 5,
wherein the imaging unit captures, through the hole in the annular board, an image of an object that is placed on the opening cover.

8. The reading device according to claim 1,
wherein the first opening of the housing has a rectangular shape,
the guiding lighting unit includes a plurality of guiding lighting units,
each of the plurality of guiding lighting units has an L-shape, and
each of the plurality of guiding lighting units is disposed at a position corresponding to a corresponding one of corners of the first opening of the housing.

9. The reading device according to claim 1, further comprising a decorative plate that covers the second opening of the housing cover, wherein the decorative plate is configured to diffuse the light emitted by the guiding lighting unit.

10. The reading device according to claim 9, wherein the decorative plate further covers a part of the first opening of the housing cover.

11. The reading device according to claim 6, wherein the annular board covers the second opening of the housing cover.

* * * * *